(12) United States Patent
Finke

(10) Patent No.: US 6,614,434 B1
(45) Date of Patent: Sep. 2, 2003

(54) ALGORITHM FOR FINDING THE EYE CROSSING LEVEL OF A MULTILEVEL SIGNAL

(75) Inventor: Warren A. Finke, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 260 days.

(21) Appl. No.: 09/595,574

(22) Filed: Jun. 14, 2000

(51) Int. Cl.[7] ............ G06T 11/20; H04B 17/00; H04B 10/08; G06F 19/00
(52) U.S. Cl. ............ 345/440; 375/226; 359/110; 702/69
(58) Field of Search ............ 345/440; 324/624; 702/119, 67; 359/110, 180, 189; 375/226

(56) References Cited

U.S. PATENT DOCUMENTS

| | | | | |
|---|---|---|---|---|
| 4,896,271 A | * | 1/1990 | Jenq et al. | 324/76.77 |
| 5,343,405 A | * | 8/1994 | Kucera et al. | 324/623 |
| 5,579,145 A | * | 11/1996 | Bogdan et al. | 356/73.1 |
| 5,652,668 A | * | 7/1997 | Aulet et al. | 359/110 |
| 5,949,399 A | * | 9/1999 | Kreft et al. | 345/440 |
| 6,419,638 B1 | * | 7/2002 | Hay et al. | 600/588 |

* cited by examiner

*Primary Examiner*—Matthew C. Bella
*Assistant Examiner*—Anthony Blackman
(74) *Attorney, Agent, or Firm*—David N. Caracappa; Thomas F. Lenihan; William K. Bucher

(57) ABSTRACT

A method for controlling a digital oscilloscope locates a crossing level in an eye diagram (also including a crossing time), of a communications signal. The method includes the steps of locating the crossing time using a horizontal histogram box; and locating the crossing level using a vertical histogram box placed at a horizontal location substantially at the located crossing time.

9 Claims, 3 Drawing Sheets

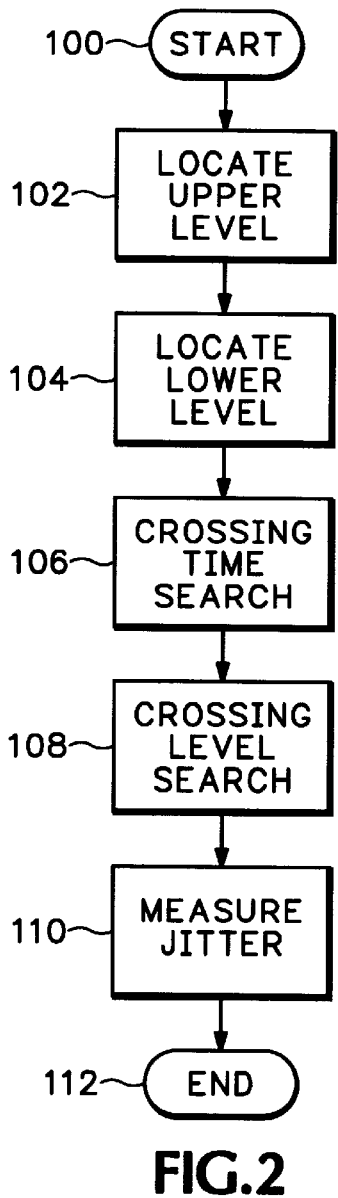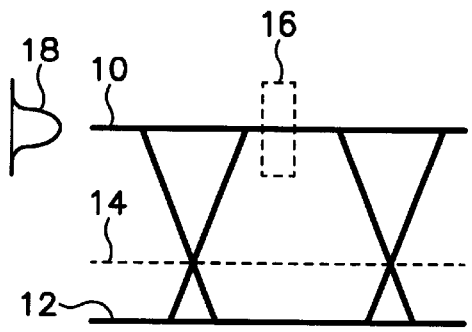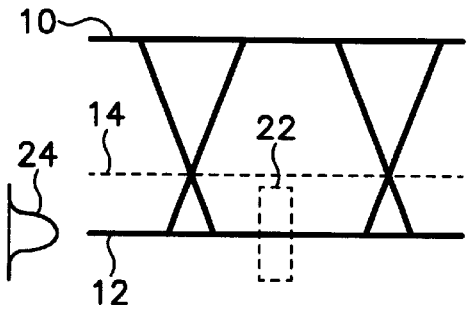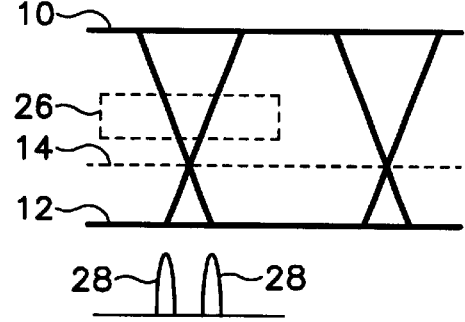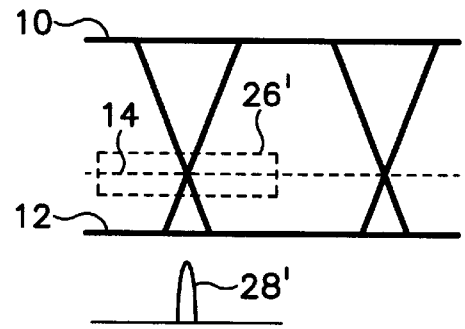

ALGORITHM FOR FINDING THE EYE CROSSING LEVEL OF A MULTILEVEL SIGNAL

FIELD OF THE INVENTION

The present invention relates to digital oscilloscopes which provide a function for detecting the crossing level of an eye pattern.

BACKGROUND OF THE INVENTION

Digital communications signals are often transmitted as signals carrying successive symbols at a predetermined rate of n symbols per second, each symbol representing some predetermined number of bits. In some communications systems, each symbol is represented by a signal nominally at a predetermined level. For example, in a binary communications system, each symbol represents one bit and has a first level representing a logical '1' signal and a second level representing a logical '0' signal. At symbol times, the communications signal is nominally at one of these two levels. At boundaries between symbols, the communications signal is changing from a level representing the value of a preceding bit to the level representing the value of the next following bit. The crossing times, where the communications signal is changing levels, must be located accurately so that the signal level in between, representing the value of the bit, may be estimated accurately. In a communications system, the jitter of the signal crossing time is an important measure of the operation of the communications system.

Such a communications signal may be displayed on an oscilloscope in the form of an eye-diagram, in a known manner. FIG. 1 is a diagram of a portion of an oscilloscope display of an eye diagram of a binary communications signal. FIG. 1 represents the display generated by a large number of scans of the communications signal. In FIG. 1 the horizontal direction represents time and the vertical direction represents the signal level e.g. voltage level. Time $t_E$ represents the 'eye' of the signal, i.e. the time when the value of the signal represents the symbol, also termed the symbol time. At $t_E$ the signal is nominally either at the upper level (e.g. representing a logical '1' signal), or at the lower level (e.g. representing a logical '0' signal). At times $t_{C1}$ and $t_{C2}$, the signal is transitioning from the level representing the preceding symbol to the level representing the next following symbol at time $t_E$. That is, the signal may be changing from the upper level to the lower level, thus crossing down, at the transition time $t_{C1}$; may be changing from the lower level to the upper level, thus crossing up, at transition time $t_{C1}$; may be remaining at the upper level; or may be remaining at the lower level. Nominally all transitions take place at precisely the crossing times $t_C$ and the communications signal is always precisely at either the upper level or lower level at the symbol time $t_E$. However, in real systems, this is not the case.

The symbol time $t_E$ is located midway between successive crossing times $t_C$. Thus, it is important to accurately locate the crossing times. However, in real systems, as illustrated in FIG. 1, the crossing times vary around a nominal crossing time $t_c$. This variation is termed jitter, and is designated $t_J$ in FIG. 1. The statistical characteristics of the jitter in a real system is important in analyzing the operation of such a system.

In FIG. 1, the jitter may be measured by locating a relatively thin horizontal histogram box at the crossing level centered in time at the crossing time, and analyzing the accumulated histogram to characterize the jitter. However, as can be seen from FIG. 1, before the jitter can be accurately measured, the location of the crossing level must be accurately determined.

Several models of prior art digital oscilloscopes include the ability to locate a histogram box at a user specified time/level location in the displayed waveform, to accumulate histogram data, in either the vertical or horizontal directions, for signals passing through that box, and to perform measurements on the accumulated histogram data. For example, among the measurements that are available to perform on the histogram data are statistical measurements such as mean and standard deviation. In addition, prior art oscilloscopes have been configured to use such information and measurements to determine the crossing level automatically.

For example, the digital oscilloscope model CSA803, manufactured by Tektronix, Inc. incorporates an algorithm for automatically locating the crossing level of the eye diagram. Specifically, the CSA803 uses histogram boxes in the following manner to determine the crossing level. Relatively thin horizontal histogram boxes are illustrated in FIG. 1 as dotted boxes 3 and 5. Histogram box 3 is placed centered in time (horizontally) at the crossing time and at a signal level (vertically) below the crossing level. A histogram of the trace data within histogram box 3 is generated and illustrated at H(3). The histogram data H(3) from histogram box 3 spans a relatively wide range and, thus, has a relatively large standard deviation. The same result would occur if the histogram box were placed above the crossing level. Histogram box 5 is placed also centered in time at the crossing time, but at the signal crossing level. A histogram of the trace data within this box is generated and illustrated at H(5). The histogram data H(5) spans a relatively narrower range and thus has a relatively smaller standard deviation. By moving the histogram box up and down, and calculating the respective standard deviations, the crossing level may be identified as the level having the minimum standard deviation. When the crossing level is determined, the histogram data may be used to measure the jitter.

Determining the crossing level is generally done by moving the histogram box up and down, for example, according to a known binary search algorithm. Because the height of the histogram box is small, and because it must be located precisely, many iterations are necessary to place the box accurately. This takes a substantial amount of time.

Digital oscilloscopes from several manufacturers also may be controlled by external controllers via existing general purpose interface bus (GPIB) interfaces. Such digital oscilloscopes can receive control data from external controllers via the GPIB bus and can also provide status data to the external controller, also via the GPIB bus. Such operation is widely used. It is possible to locate histogram boxes under remote control through command data sent to the oscilloscope through the GPIB bus, and to receive data and calculations related to the histogram bus through status data from the oscilloscope through the GPIB bus. Such a method will, necessarily be slower than a method which may be calculated within an oscilloscope.

It is desirable to locate the crossing point of a communications signal being displayed on a digital oscilloscope in a minimum amount of time. In addition, it is desirable to be able to locate the crossing point of the communications signal under remote control.

BRIEF SUMMARY OF THE INVENTION

A method for controlling a digital oscilloscope locates a crossing level in an eye diagram (also including a crossing time), of a communications signal. The method includes the steps of locating the crossing time using a horizontal histogram box; and locating the crossing level using a vertical histogram box placed at a horizontal location substantially at the located crossing time.

BRIEF DESCRIPTION OF THE DRAWING

In the drawing:

FIG. 2 is a flowchart of one method for calculating the crossing level according to the present invention;

FIGS. 3 through 8 are schematic diagrams of an eye waveform diagram useful in understanding the operation of the present invention;

DETAILED DESCRIPTION OF THE INVENTION

Figure 1:
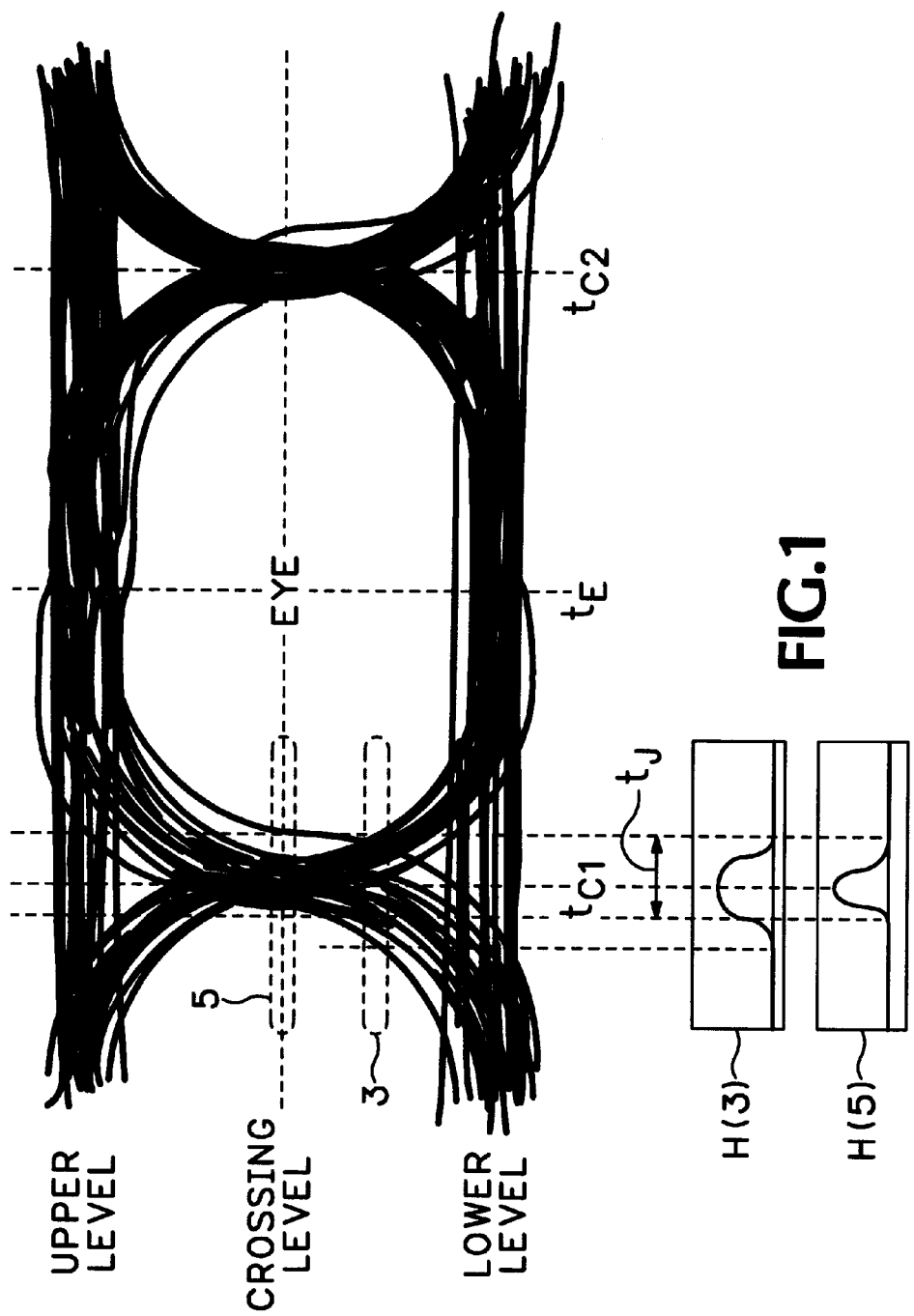
FIG. 1 is an eye waveform diagram useful in understanding the present invention.

FIG. 2 is a flow chart illustrating a method of operating a digital oscilloscope to calculate the crossing level of a communications signal in accordance with the present invention. FIGS. 3 through 8 are schematic diagrams of eye waveform diagrams useful in understanding the operation of the present invention. In FIGS. 3 through 8, the eye diagram is illustrated using thick lines instead of repeated traces. This is meant only to simplify the diagram and not to represent an eye diagram of an actual communication signal. In FIGS. 3 through 8, an upper level is designated vTop, and is represented by a line 10; a lower level is designated vBase, and is represented by a line 12; and a crossing level is represented by a dashed line 14.

The method starts in step 100. In step 102 the upper signal level vTop is detected. This is done by locating a vertical histogram box as illustrated in FIG. 3. A dashed box 16 represents the location of the histogram box placed by step 102 (of FIG. 2). In FIG. 3, the vertical location of the histogram box 16 is within the minimum and maximum limits of the upper level, and the horizontal location of the histogram box 16 is substantially at the symbol time. When the histogram box 16 has been placed, traces of the communication signal are accumulated. In step 102, the vertical histogram data is retrieved. The mean and standard deviation of the histogram data is calculated. The mean of this data represents the location of the upper level vTop.

In step 104, the lower signal level is detected. This is done by locating a vertical histogram box as illustrated in FIG. 4. A dashed box 22 represents the location of the histogram box placed by step 104 (of FIG. 2). In FIG. 4, the vertical location of the histogram box 22 is within the minimum and maximum limits of the lower level, and the horizontal location of the histogram box 22 is substantially at the symbol time. When the histogram box 22 has been placed, traces of the communication signal are accumulated. In step 102, the vertical histogram data is retrieved. The mean and standard deviation of the histogram data is calculated. The mean of this data represents the location of the lower level.

In step 106, a rough search for the crossing time is performed. First, the vertical center of a relatively tall horizontal histogram box 26 is located at the nominal location of the crossing level (CL) as illustrated in FIG. 5. The preferred height of the histogram box 26 is substantially 20% of the difference between vTop and vBase. The nominal level of the histogram box 26 is substantially at the midpoint between the upper level vTop and the lower level vBase. The horizontal extent of the histogram box 26 is substantially the time between symbols, so that it is centered over the nominal crossing time. More specifically, the nominal crossing level CL may be calculated as:

$$CL=0.5[\{vTop-3\sigma(vTop)\}-\{vBase+3\sigma(vBase)\}]$$

When the horizontal histogram box 26 has been placed, traces of the communications signal are accumulated. The horizontal histogram data is illustrated as 28 in FIG. 4. In step 106, the standard deviation of the horizontal histogram data 28 is computed. Then the location of the histogram box 26 is moved vertically to locate the vertical location having the minimum standard deviation. Any method may be used, though a binary search is preferred. This search concludes when the vertical location of the histogram box is set to a predetermined accuracy. The results of step 106 is illustrated in FIG. 6 in which the relocated histogram box 26' generates histogram data 28'. Because the height of the histogram box 26 is relatively large, histogram points are accumulated rapidly, and this step will not take a long time to perform. The histogram data 28' measured with a histogram box 26, located at the crossing point (FIG. 6), has the minimum standard deviation compared to a histogram box at any other vertical location. The crossing time is assumed to be the mean of the histogram data 28'.

Figure 7:
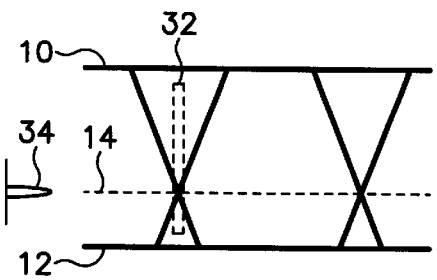

In step 108, a narrow vertical histogram box 32 is located at the nominal crossing time determined in step 106, as illustrated in FIG. 7. The horizontal midpoint of the histogram box 32 is set to the horizontal location of the mean of the histogram data 28' collected in step 106, from the histogram box 26', i.e. the crossing time. The vertical extent of the vertical histogram box 32 is set to between vTop−6σ(vTop) and vBase+6σ(vBase). When the vertical histogram box 32 has been placed, traces of the communications signal are accumulated. The vertical histogram data is illustrated as 34 in FIG. 7. The mean of the vertical histogram data 34 is assumed to be the crossing level.

Figure 8:
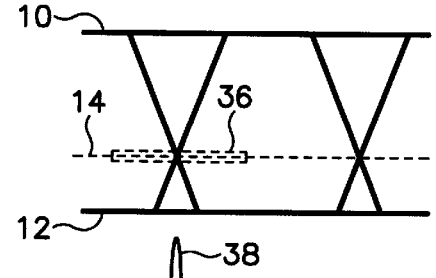

Because the crossing level has been accurately located, it is possible to accurately measure jitter in the communications signal. In step 110, a narrow horizontal histogram box 36 is located at the crossing level, as illustrated in FIG. 8. The vertical midpoint of a narrow horizontal histogram box is set to the location of the mean of the vertical histogram data 34 collected in step 108, from the histogram box 32, i.e. the crossing level. The horizontal extent of the horizontal histogram box is set to the width of the histogram box 26 illustrated in FIGS. 5 and 6, i.e. the symbol time. When the horizontal histogram box 36 has been placed, traces of the communications signal are accumulated. The horizontal histogram data is illustrated as 38 in FIG. 8. The RMS jitter value is equal to the standard deviation of the histogram data 38. The peak-to-peak jitter value is equal to the difference between the minimum and maximum value of the histogram data 38. The 6 sigma jitter value is equal to six times the RMS jitter value.

By using alternating vertical and horizontal histogram boxes to locate the crossing time and crossing level, as described above, the number of histograms that must be calculated are minimized compared to the prior art method discussed above) of moving a relatively thin horizontal histogram box up and down to locate the crossing level. This minimizes the time necessary to locate the crossing level, and permits jitter measurements to be commenced faster.

This method described above also allows a remotely controlled digital oscilloscope to accurately locate the crossing level in a communications signal eye diagram, and use the crossing level to perform jitter monitoring and analysis.

Figure 9:
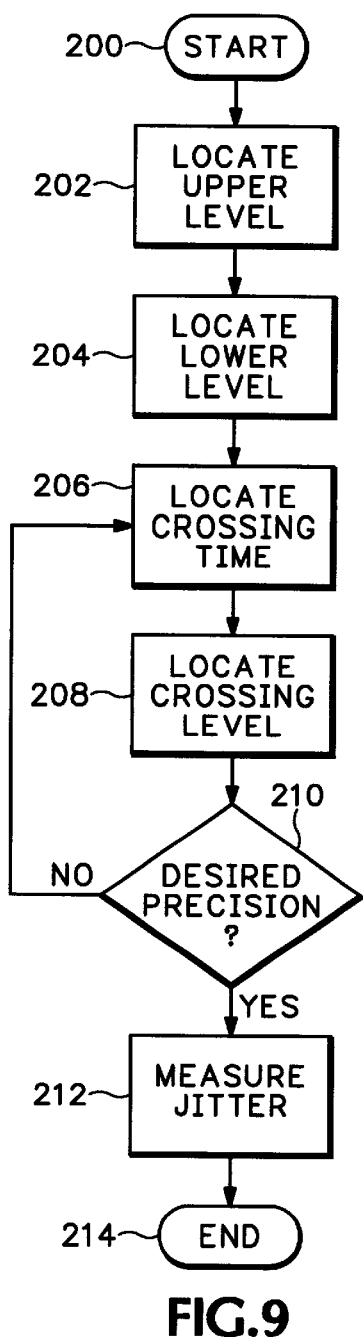
FIG. 9 is a flowchart of an alternative method for calculating the crossing level according to the present invention.

An alternative method is illustrated in FIG. 9. The method of FIG. 9 begins in step 200. In step 202, the upper level vTop is located in the same way as illustrated in FIG. 3, and described in more detail above with reference to step 102 of FIG. 2. Similarly, in step 204, the lower level vBase is located in the same way as illustrated in FIG. 4, and described in more detail above with reference to step 204 of FIG. 2.

Figure 10:
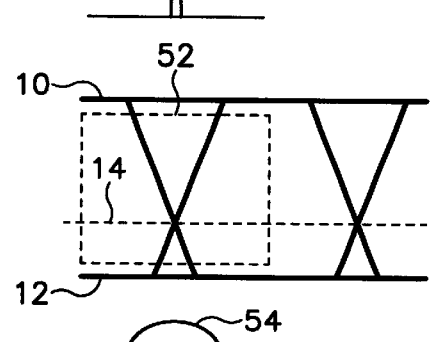
FIGS. 10 through 12 are schematic diagrams of an eye waveform diagram useful in understanding the operation of the present invention.

In step 206, a horizontal histogram box 52 is located as illustrated in FIG. 10. The horizontal width of the histogram box 52 is set to the approximate time between crossings, and the vertical extent is set to from vTop−6σ(vTop) to vBase+6σ(vBase). The histogram box 52 covers the time neighborhood of the crossing. When the horizontal histogram box 52 has been placed, traces of the communications signal are accumulated. The horizontal histogram data is illustrated as 54 in FIG. 10. The mean and standard deviation of the histogram data 54 is calculated. In this manner the crossing time is located to a relatively coarse resolution.

Figure 11:
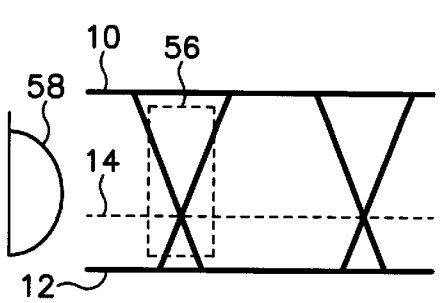

In step 208, a vertical histogram box is placed having a width which is the standard deviation calculated from the horizontal histogram data 54 in step 206, while the height of the vertical histogram box remains the same, i.e. having an extent from just below the upper level vTop to just above the lower level vBase. The horizontal midpoint of the histogram box is located at the horizontal location of the mean of the horizontal histogram data 54. The resulting vertical histogram box 56 is illustrated in FIG. 11. When the vertical histogram box 56 has been located, traces of the communications signal are accumulated. Vertical histogram data 58 is accumulated and the mean and standard deviation is calculated from the vertical histogram data 58. The mean of the vertical histogram data represents the location of the crossing level, while the standard deviation of the vertical histogram data represents the precision with which the crossing level has been located.

Figure 12:
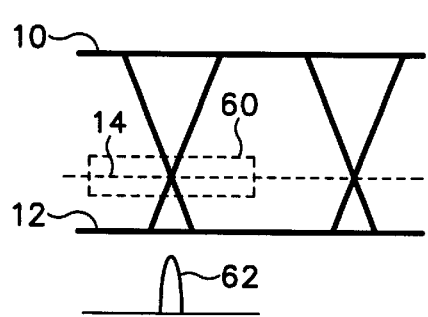

In step 210, it is determined whether the crossing level has been located to the desired precision. If the crossing level has been located to within the desired precision, then the jitter is measured in step 212 in the same manner as described above for step 110 in FIG. 2, and illustrated in FIG. 8. If, however, the crossing level has not been located to within the desired precision, then steps 206, 208 and 210 are repeated. The height of the horizontal histogram box is reduced to the standard deviation calculated from the vertical histogram data 58 in step 208, while the width of the horizontal histogram box remains the same as the width of the original histogram box 52 (in FIG. 10), i.e. the symbol time. The vertical midpoint of the horizontal histogram box is located at the vertical location of the mean of the vertical histogram data 58. The resulting histogram box 60, and resulting histogram data 62 is illustrated in FIG. 12. Steps 206, 208 and 210 are then repeated. As described above, when step 210 is repeated, if the crossing level has been located to the desired precision, then jitter is measured in step 212. Otherwise the sizes of the horizontal and vertical histogram boxes are reduced, as described above, and steps 206, 208 and 210 are repeated yet again.

Again, because alternating horizontal and vertical histogram boxes are used to alternately locate the crossing time and crossing level, instead of a single relatively thin horizontal histogram box, as in the prior art, the crossing level may be located more quickly. This permits jitter measurements to be initiated faster.

In either method (FIG. 2 or FIG. 9) a digital oscilloscope may be controlled by a remote controller via e.g. a GPIB bus to locate the crossing level of an eye diagram of a communications signal automatically and quickly, without requiring a digital oscilloscope to include this function internally.

It has been illustrated how to locate the crossing level in an eye diagram of a binary communications signal. One skilled in the art will understand, however, that the same technique may be used to determine the respective crossing levels of a multilevel communications signal, such a trinary or quaternary communications signal.

What is claimed is:

1. A method for controlling a digital oscilloscope to locate a crossing level in an eye diagram of a communications signal, the eye diagram including an upper level and a lower level, a crossing time and a symbol time, comprising the steps of:

locating the upper level using a vertical histogram box;

locating the lower level using a vertical histogram box;

locating the crossing time by placing a horizontal histogram box centered at a vertical location substantially midway between the upper and lower levels having a width substantially corresponding to a symbol time, and a height substantially 20% or greater of the distance between the upper level and the lower level of the eye diagram; and locating the crossing level using a vertical histogram box placed at a horizontal location substantially at the located crossing time.

2. The method of claim 1 wherein the height of the horizontal histogram box is substantially 20% of the difference between the upper level and the lower level of the eye diagram.

3. The method of claim 1 wherein the step of locating the crossing time further comprises the steps of:

accumulating histogram data corresponding to scans of the communications signal;

calculating the mean and standard deviation of the histogram data;

moving the horizontal histogram box vertically and repeating the accumulating and calculating steps until the standard deviation is minimized, then designating the horizontal location of the mean as the crossing time.

4. The method of claim 3, wherein the moving step comprises using a binary search algorithm to locate the vertical location of the horizontal histogram box having the minimum standard deviation.

5. The method of claim 3, wherein:

the step of locating the upper level comprises the steps of:

locating a vertical histogram box at a vertical position within respective minimum and maximum limits of the upper level and at a horizontal position in the neighborhood of the symbol time;

accumulating histogram data corresponding to scans of the communications signal;

calculating the mean and standard deviation of the histogram data; and designating the vertical location corresponding to the mean as the upper level; and the step of locating the lower level comprises the steps of:

locating a vertical histogram box at a vertical position within respective minimum and maximum limits of the lower level and at a horizontal position in the neighborhood of the symbol time;

accumulating histogram data corresponding to scans of the communications signal;

calculating the mean and standard deviation of the histogram data; and designating the vertical location corresponding to the mean as the lower level.

6. The method of claim 1 wherein the step of locating the crossing level comprises the steps of:

locating a relatively narrow vertical histogram box centered horizontally substantially at the located crossing time;

accumulating histogram data corresponding to scans of the communications signal;

calculating the mean of the histogram data; and designating the vertical location corresponding to the mean of the histogram data as the crossing level.

7. The method of claim 1 wherein the step of locating the crossing time further comprises the step of placing the horizontal histogram box having a vertical extent from just below the upper level to just above the lower level.

8. The method of claim 7, wherein:

the step of locating the crossing time further comprises the steps of:

placing the horizontal histogram box;

accumulating horizontal histogram data corresponding to scans of the communications signal; calculating the mean and standard deviation of the horizontal histogram data;

the step of locating the crossing level comprises the steps of:

placing the vertical histogram box, having a width corresponding to the standard deviation of the horizontal histogram box, and a vertical extent from just below the upper level to just above the lower level, centered horizontally around the horizontal location corresponding to the mean of the horizontal histogram data;

accumulating vertical histogram data corresponding to scans of the communications signal;

calculating the mean and standard deviation of the vertical histogram data;

designating the crossing level as the vertical location corresponding to the mean of the vertical histogram data; and the method further comprises the steps of:

determining the precision of the location of the crossing level;

if the precision of the crossing level is not within a predetermined precision:

setting the height of the horizontal histogram box to the standard deviation of the vertical histogram data; and repeating the steps of locating the crossing time and locating the crossing level.

9. The method of claim 7, wherein the eye diagram further includes a symbol time, and:

the step of locating the upper level comprises the steps of:

locating a vertical histogram box at a vertical position within respective minimum and maximum limits of the upper level and at a horizontal position in the neighborhood of the symbol time;

accumulating upper level histogram data corresponding to scans of the communications signal;

calculating the mean and standard deviation of the histogram data; and designating the vertical location corresponding to the mean as the upper level (vTop); and the step of locating the lower level comprises the steps of:

locating a vertical histogram box at a vertical position within respective minimum and maximum limits of the lower level and at a horizontal position in the neighborhood of the symbol time;

accumulating lower level histogram data corresponding to scans of the communications signal;

calculating the mean and standard deviation of the histogram data; and designating the vertical location corresponding to the mean as the lower level (vBase); and the step of locating the crossing time further comprises the steps of:

placing the horizontal histogram box having a vertical extent from vTop−6σ(vTop) to vBase+6σ(vBase), where 6σ(vTop) is equal to six times the standard deviation of the upper level histogram data and 6σ(vBase) is equal to six times the standard deviation of the lower level histogram data.

* * * * *